US012677225B2

(12) United States Patent (10) Patent No.: US 12,677,225 B2
Kurita et al. (45) Date of Patent: Jul. 7, 2026

(54) RADIO COMMUNICATION NODE

(71) Applicant: NTT DOCOMO, INC., Tokyo (JP)

(72) Inventors: Daisuke Kurita, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 328 days.

(21) Appl. No.: 17/788,867

(22) PCT Filed: Dec. 25, 2019

(86) PCT No.: PCT/JP2019/051029
§ 371 (c)(1),
(2) Date: Jun. 24, 2022

(87) PCT Pub. No.: WO2021/130942
PCT Pub. Date: Jul. 1, 2021

(65) Prior Publication Data
US 2023/0049634 A1 Feb. 16, 2023

(51) Int. Cl.
*H04W 52/16* (2009.01)

(52) U.S. Cl.
CPC ................................... *H04W 52/16* (2013.01)

(58) Field of Classification Search
CPC ... H04W 16/26; H04W 52/143; H04W 52/16; H04W 52/241; H04W 52/245; H04W 52/267; H04W 92/20
See application file for complete search history.

(56) References Cited

U.S. PATENT DOCUMENTS

| | | | |
|---|---|---|---|
| 10,470,136 B1 | 11/2019 | Ghosh et al. | |
| 2013/0210341 A1 | 8/2013 | Kiyoshima et al. | |
| 2013/0242791 A1* | 9/2013 | Lim ..................... | H04W 52/143 |
| | | | 370/252 |
| 2016/0036571 A1* | 2/2016 | Park ....................... | H04L 5/0048 |
| | | | 370/330 |
| 2020/0045555 A1* | 2/2020 | Huang ................... | H04W 72/20 |
| 2020/0107362 A1* | 4/2020 | Qi ........................ | H04W 52/362 |
| 2021/0274449 A1* | 9/2021 | Choi ..................... | H04W 88/14 |
| 2021/0345324 A1* | 11/2021 | Liu ........................ | H04L 5/1469 |
| 2022/0007297 A1* | 1/2022 | Zheng ................... | H04W 88/14 |
| 2022/0007307 A1* | 1/2022 | Kim ....................... | H04W 52/46 |
| 2022/0330176 A1* | 10/2022 | Kowalski ............ | H04W 52/325 |

FOREIGN PATENT DOCUMENTS

| | | |
|---|---|---|
| CN | 103155657 A | 6/2013 |
| JP | 2010-109914 A | 5/2010 |
| JP | 2019-124941 A | 7/2019 |

(Continued)

OTHER PUBLICATIONS

International Search Report issued in PCT/JP2019/051029 on Sep. 8, 2020 (2 pages).

(Continued)

*Primary Examiner* — Nguyen T Vo
(74) *Attorney, Agent, or Firm* — Osha Bergman Watanabe & Burton LLP

(57) ABSTRACT
A wireless communication node sets a downlink target value of a received power of a downlink from an upper node based on a received power of an uplink from a lower node, and transmits, to the upper node, power control information based on the downlink target value.

2 Claims, 11 Drawing Sheets

(56)        References Cited

FOREIGN PATENT DOCUMENTS

| JP | 2019125941 A | 7/2019 |
| WO | 2012/046657 A1 | 4/2012 |

OTHER PUBLICATIONS

Written Opinion of the International Searching Authority issued in PCT/JP2019/051029 on Sep. 8, 2020 (3 pages).

Qualcomm; "New WID on Enhancements to Integrated Access and Backhaul"; 3GPP TSG RAN Meeting #86, RP-192521; Sitges, Spain; Dec. 9-12, 2019 (5 pages).

3GPP TR 38.874 V16.0.0; "3rd Generation Partnership Project; Technical Specification Group Radio Access Network; NR; Study on Integrated Access and Backhaul; (Release 16)"; Dec. 2018 (111 pages).

Office Action issued in Chinese Application No. 201980103148.9, mailed Jul. 15, 2024 (14 pages).

Office Action issued in Chinese Patent Application No. 201980103148.9, dated Aug. 9, 2025 (11 pages).

\* cited by examiner

FIG. 6

DU UL Rx power < MT DL Rx power

DU UL Rx power > MT DL Rx power

FIG. 11

1. DL-TPC bit

| Reference (TS38.212) | |
|---|---|
| 6.3.1.1.x | DL-TPC |

FIG. 12

2. HARQ-ACK, SR, DL-TPC/HARQ-ACK, CSI, DL-TPC

| Reference (TS38.212) | |
|---|---|
| 6.3.1.1.x | HARQ-ACK, SR, DL-TPC |
| (no SR) | HARQ-ACK, DL-TPC |
| (HARQ-ACK bits=0) | SR, DL-TPC |

| Reference (TS38.212) | |
|---|---|
| 6.3.1.1.x | HARQ-ACK, CSI, DL-TPC |
| (no DL-TPC) | HARQ-ACK, CSI |
| (HARQ-ACK bits=0) | DL-TPC, CSI |

FIG. 13

3. HARQ-ACK, SR, CSI, DL-TPC

| Reference (TS38.212) | |
|---|---|
| 6.3.1.1.x | HARQ-ACK, SR, CSI, DL-TPC |
| (no SR) | HARQ-ACK, CSI, DL-TPC |
| (HARQ-ACK bits=0) | SR, CSI, DL-TPC |
| (no DL-TPC) | HARQ-ACK, SR, CSI |
| (no SR) (HARQ-ACK bits=0) | CSI, DL-TPC |
| (no SR), (no DL-TPC) | HARQ-ACK, CSI |
| (HARQ-ACK bits=0) (no DL-TPC) | SR, CSI |

FIG. 14

Table 6.2.1-2 Values of LCID for UL-SCH

| Index | LCID values |
|---|---|
| 0 | CCCH of size 64 bits (referred to as "CCCH1"in TS 38.331 [5]) |
| 1-32 | Identity of the logical channel |
| 33-51 | Reserved |
| 52 | CCCH of size 48 bits (referred to as "CCCH"in TS 38.331 [5]) |
| 53 | Recommended bit rate query |
| 54 | Multiple Entry PHR (four octets C) |
| 55 | Configured Grant Confirmation |
| 56 | Multiple Entry PHR (one octet C) |
| 57 | Single Entry PHR |
| 58 | C-RNTI |
| 59 | Short Truncated BSR |
| 60 | Long Truncated BSR |
| 61 | Short  BSR |
| 62 | Long  BSR |
| 63 | Padding |

RADIO COMMUNICATION NODE

TECHNICAL FIELD

The present disclosure relates to a wireless communication node that sets a radio access and a wireless backhaul.

BACKGROUND ART

The 3rd Generation Partnership Project (3GPP) has specified Long Term Evolution (LTE), and for the purpose of further increasing the speed of the LTE, LTE-Advanced (hereinafter referred to as LTE including LTE-Advanced), and furthermore, 5G New Radio (NR) or a successor system of the LTE called Next Generation (NG), and the like is being specified.

For example, in the radio access network (RAN) of the NR, Integrated Access and Backhaul (IAB) in which radio access to a terminal (User Equipment, UE) and a wireless backhaul between wireless communication nodes such as radio base stations (gNB) are integrated is being considered (see Non Patent Literature 1).

In the IAB, an IAB node has a Mobile Termination (MT), which is a function for connecting to a parent node (may also be referred to as an IAB donor), and a Distributed Unit (DU), which is a function for connecting to a child node or UE.

In Release 16 of 3GPP, the radio access and the wireless backhaul are premised on half-duplex communication (Half-duplex) and time division multiplexing (TDM). Furthermore, in Release 17, application of frequency division multiplexing (FDM), space division multiplexing (SDM), and full-duplex communication (Full-duplex) is being considered (Non Patent Literature 2). In other words, simultaneous operation of the MT and the DU is being considered.

CITATION LIST

Non Patent Literature

Non Patent Literature 1

3GPP TR 38.874 V16.0.0, 3rd Generation Partnership Project; Technical Specification Group Radio Access Network; NR; Study on Integrated Access and Backhaul; (Release 16), 3GPP, December 2018

Non Patent Literature 2

"New WID on Enhancements to Integrated Access and Backhaul", RP-192521, 3GPP TSG RAN Meeting #86, 3GPP, December 2019

SUMMARY OF INVENTION

However, the simultaneous operation of the MT and the DU has the following problems. Specifically, when the MT and the DU receive a radio signal using the same time resource, it is assumed that a difference occurs between the power of the radio signal received by the MT and the power (hereinafter referred to as received power) of the radio signal received by the DU.

If such a difference in the received power is large, a radio signal with low received power cannot be normally received. This is because a radio signal with high received power interferes with a radio signal with low received power.

Furthermore, when a receiver is shared between the MT and the DU in the wireless communication node, a radio signal with low received power may fall out of the receivable range if the receiver is adjusted to a radio signal with high received power.

Therefore, the following disclosure is contrived in view of such a situation, and aims to provide a wireless communication node capable of normally receiving a radio signal even when the Mobile Termination (MT) and the Distributed Unit (DU) operate simultaneously in the Integrated Access and Backhaul (IAB).

According to one aspect of the present disclosure, there is provided a wireless communication node (e.g., the wireless communication node 100B) including a control unit (control unit 170) that sets a downlink target value of a received power of a downlink from an upper node (e.g., wireless communication node 100A) based on a received power of an uplink from a lower node (e.g., UE 200), and a transmitting unit (power control information transmitting unit 180) that transmits power control information based on the downlink target value to the upper node.

BRIEF DESCRIPTION OF DRAWINGS

FIG. 6 is a conceptual view of multiplexing and communication scheme that can be applied in the IAB of 3GPP Release-17.

FIG. 11 is a view illustrating a setting example (part 1) of DL-TPC according to operation example 2.

FIG. 12 is a view illustrating a setting example (part 2) of DL-TPC according to operation example 2.

FIG. 13 is a view illustrating a setting example (part 3) of DL-TPC according to operation example 2.

FIG. 14 is a view illustrating a setting example (part 4) of DL-TPC according to operation example 2.

DESCRIPTION OF EMBODIMENT

Figure 1:
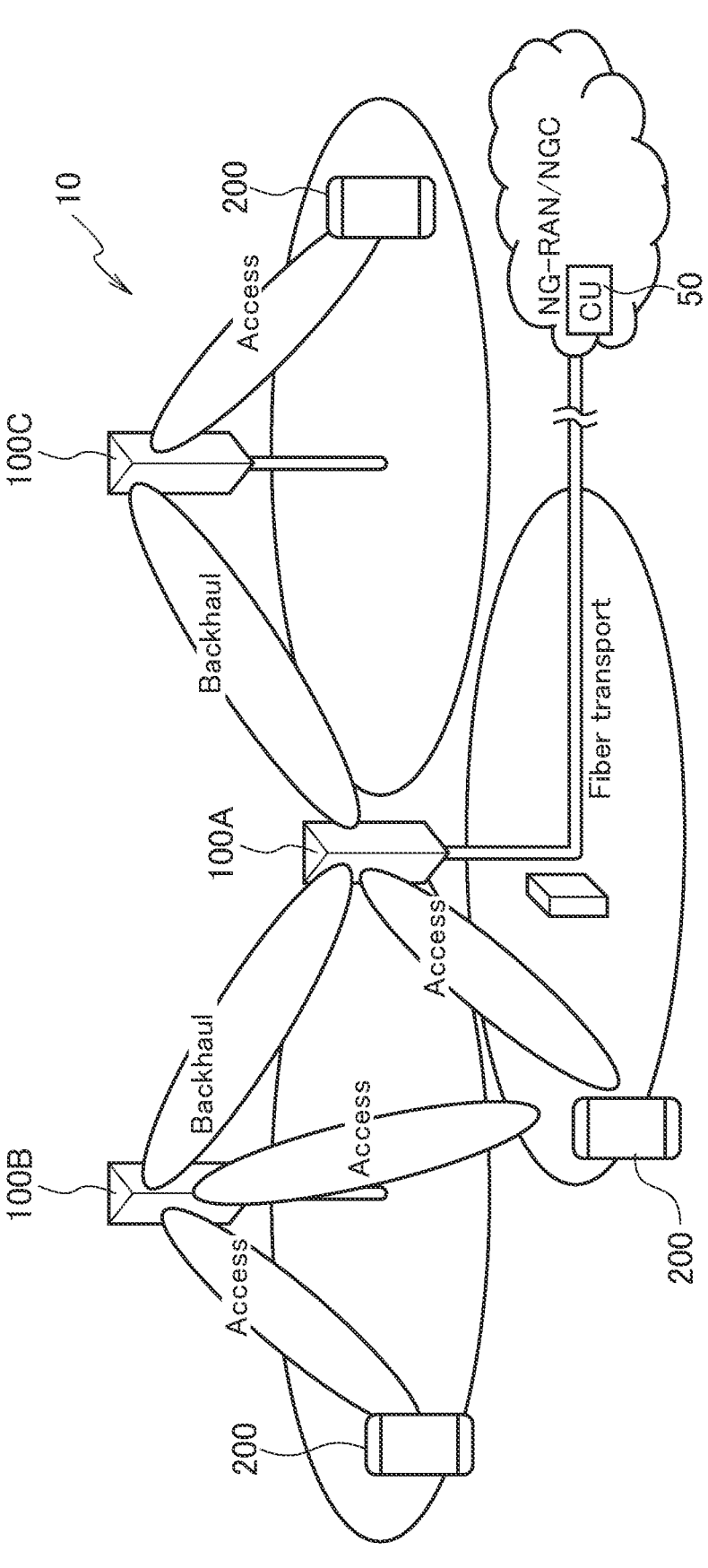
FIG. 1 is an overall schematic configuration view of a wireless communication system 10.

An embodiment will be described below with reference to the drawings. The same functions and configurations are denoted with the same or similar reference numerals, and the description thereof will be appropriately omitted.

(1) Overall Schematic Configuration of Wireless Communication System

FIG. 1 is an overall schematic configuration view of a wireless communication system 10 according to the present embodiment. The wireless communication system 10 is a wireless communication system compliant with the 5G New Radio (NR), and includes a plurality of wireless communication nodes and terminals.

Specifically, the wireless communication system 10 includes wireless communication nodes 100A, 100B, 100C and a terminal 200 (hereinafter referred to as UE 200, User Equipment).

The wireless communication nodes 100A, 100B, 100C can set a radio access with the UE 200 and a wireless backhaul (BH) between the wireless communication nodes. Specifically, a backhaul (transmission path) by a radio link is set between the wireless communication node 100A and the wireless communication node 100B, and between the wireless communication node 100A and the wireless communication node 100C.

The configuration in which the radio access with the UE 200 and the wireless backhaul between the wireless communication nodes are integrated in such manner is called an Integrated Access and Backhaul (IAB).

The IAB reuses existing functions and interfaces defined for radio access. In particular, Mobile-Termination (MT), gNB-DU (Distributed Unit), gNB-CU (Central Unit), User Plane Function (UPF), Access and Mobility Management Function (AMF) and Session Management Function (SMF), as well as corresponding Interfaces such as NR Uu (MT to gNB/DU), F1, NG, X2 and N4 are used as the baseline.

The wireless communication node 100A is connected to an NR radio access network (NG-RAN) and a core network (Next Generation Core (NGC) or 5GC) via a wired transmission path such as a fiber transport. The NG-RAN/NGC includes a Central Unit 50 (hereinafter referred to as CU50) that is a communication node. It should be noted that the NG-RAN and the NGC may be simply expressed as "network".

Note that the CU 50 may be configured by any of the above UPF, AMF, SMF or a combination thereof. Alternatively, the CU 50 may be a gNB-CU as described above.

Figure 2:
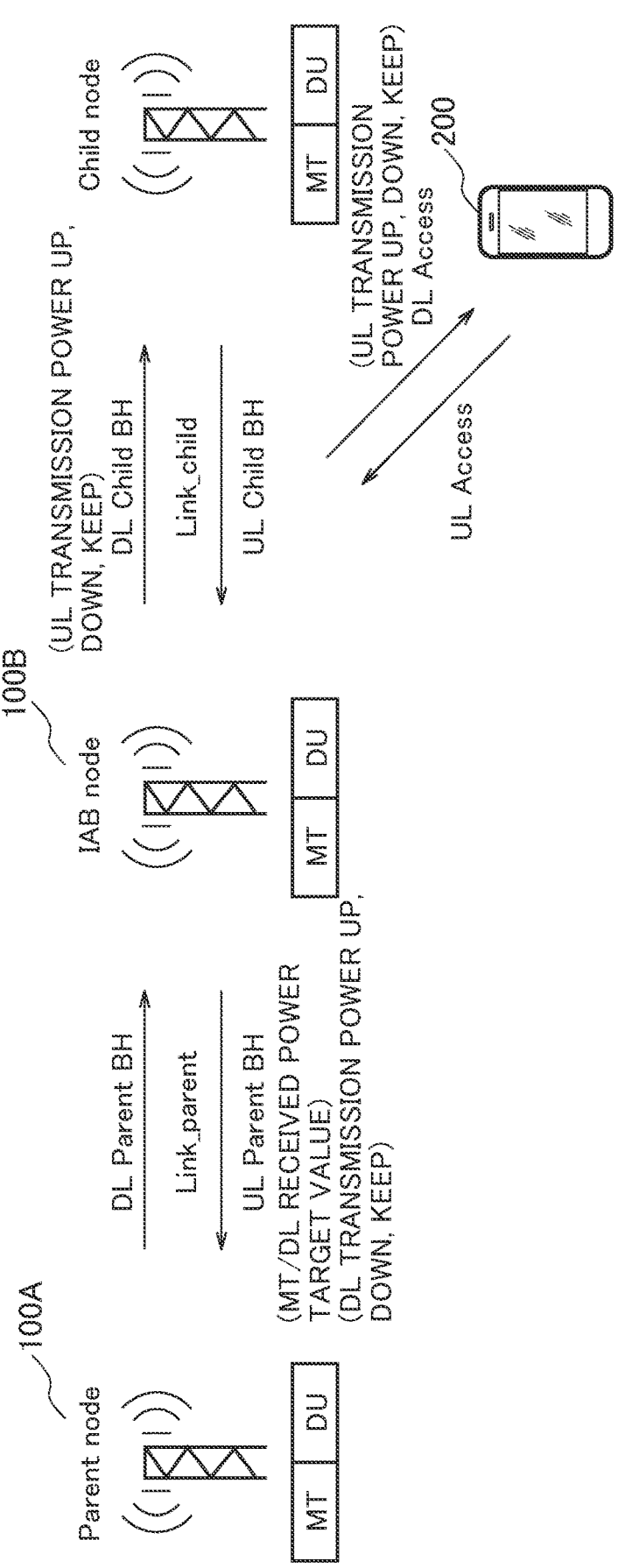
FIG. 2 is a view illustrating a basic configuration example of the IAB.

FIG. 2 is a view illustrating a basic configuration example of the IAB. As illustrated in FIG. 2, in the present embodiment, the wireless communication node 100A forms a parent node (Parent node) in the IAB, and the wireless communication node 100B (and the wireless communication node 100C) forms an IAB node in the IAB. Note that the parent node may be referred to as an IAB donor.

A child node (Child node) in the IAB is configured by another wireless communication node not illustrated in FIG. 1. Alternatively, the UE 200 may configure a child node.

A wireless link is set up between the parent node and the IAB node. Specifically, a wireless link referred to as Link_parent is set.

A wireless link is set up between the IAB node and the child node. Specifically, a wireless link referred to as Link_child is set.

A wireless link established between such wireless communication nodes is referred to as a wireless backhaul link. Link_parent is formed of a DL Parent BH in the downlink (DL) direction and a UL Parent BH in the uplink (UL) direction. Link_child is formed of a DL Child BH in the DL direction and a UL Child BH in the UL direction.

That is, in the IAB, the direction from the parent node to the child node (including UE 200) is the DL direction, and the direction from the child node to the parent node is the UL direction.

The wireless link set between the UE 200 and the IAB node or the parent node is referred to as a radio access link. Specifically, the wireless link is composed of a DL Access in the DL direction and a UL Access in the UL direction.

The IAB node has a Mobile Termination (MT), which is a function for connecting to a parent node, and a Distributed Unit (DU), which is a function for connecting to a child node (or UE 200). The child node may be referred to as a lower node.

Similarly, the parent node has an MT for connecting with an upper node and a DU for connecting with a lower node such as an IAB node. The parent node may have a CU (Central Unit) instead of the MT.

Furthermore, similarly to the IAB node and the parent node, the child node also has an MT for connecting with an upper node such as the IAB node and a DU for connecting with a lower node such as the UE 200.

Radio resources used by the DU are, in terms of DU, DL, UL, and Flexible time-resource (D/U/F), and the radio resources are classified into one of the types, Hard, Soft or Not Available (H/S/NA). Furthermore, available (available) or unavailable (not available) is also prescribed in the software (S).

Note that the IAB configuration example illustrated in FIG. 2 uses CU/DU division, but the IAB configuration is not necessarily limited to such a configuration. For example, in the wireless backhaul, the IAB may be configured by tunneling using GPRS Tunneling Protocol (GTP)-U/User Datagram Protocol (UDP)/Internet Protocol (IP).

The main advantage of such an IAB is that NR cells can be arranged flexibly and at high density without densifying the transport network. The IAB can be applied to various scenarios such as arrangement of small cells outdoors, indoors, and even support for mobile relays (e.g., in buses and trains).

As illustrated in FIGS. 1 and 2, the IAB may also support NR-only standalone (SA) development, or non-standalone (NSA) development including other RATS (such as LTE).

In the present embodiment, the radio access and the wireless backhaul can operate as half-duplex communication (Half-duplex) or full-duplex communication (Full-duplex).

Furthermore, as the multiplexing scheme, time division multiplexing (TDM), frequency division multiplexing (FDM) and space division multiplexing (SDM) can be used. That is, in the present embodiment, the simultaneous operation of the DU and the MT of the IAB node is realized by using FDM/SDM.

(2) Functional Block Configuration of Wireless Communication System

Next, the functional block configurations of the wireless communication node 100A, the wireless communication node 100B, and the UE 200 that form the wireless communication system 10 will be described.

(2.1) Wireless Communication Node 100A

Figure 3:
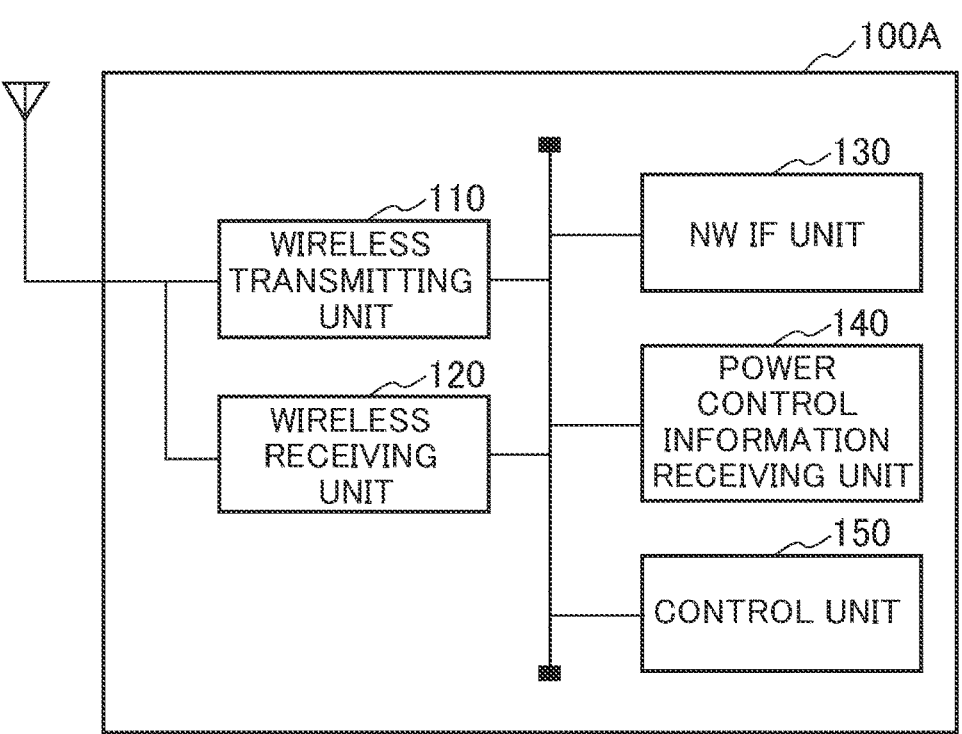
FIG. 3 is a functional block configuration view of a wireless communication node 100A.

FIG. 3 is a functional block configuration view of the wireless communication node 100A that form a parent node. As illustrated in FIG. 3, the wireless communication node 100A includes a wireless transmitting unit 110, a wireless receiving unit 120, a NW IF unit 130, a power control information receiving unit 140, and a control unit 150.

The wireless transmitting unit 110 transmits a radio signal compliant with the 5G specifications. In addition, the wireless receiving unit 120 transmits a radio signal compliant with the 5G specifications. In the present embodiment, the wireless transmitting unit 110 and the wireless receiving unit 120 execute wireless communication with the wireless communication node 100B that forms the IAB node.

In the present embodiment, the wireless communication node 100A has the functions of the MT and the DU, and the wireless transmitting unit 110 and the wireless receiving unit 120 also transmit and receive radio signals in correspondence with the MT/DU.

The NW IF unit 130 provides a communication interface that realizes a connection with the NGC side or the like. For example, the NW IF unit 130 may include interfaces such as X2, Xn, N2, N3.

The power control information receiving unit 140 receives the power control information transmitted from the IAB node. Specifically, the power control information receiving unit 140 can receive power control information indicating the difference between a target value of the received power of the DL from the parent node (upper node) (DL received power target value) and the actual received power of the DL.

Furthermore, the power control information receiving unit 140 can also receive power control information instructing increase (UP), decrease (DOWN), or maintenance (KEEP) of the DL transmission power from the parent node. The power control information receiving unit 140 may receive the DL received power target value and the actual received power of the DL.

The control unit 150 executes control of each functional block forming the wireless communication node 100A. Particularly, in the present embodiment, the control unit 150 controls the transmission power of the DL of the DU based on the power control information received by the power control information receiving unit 140.

(2.2) Wireless Communication Node 100B

Figure 4:
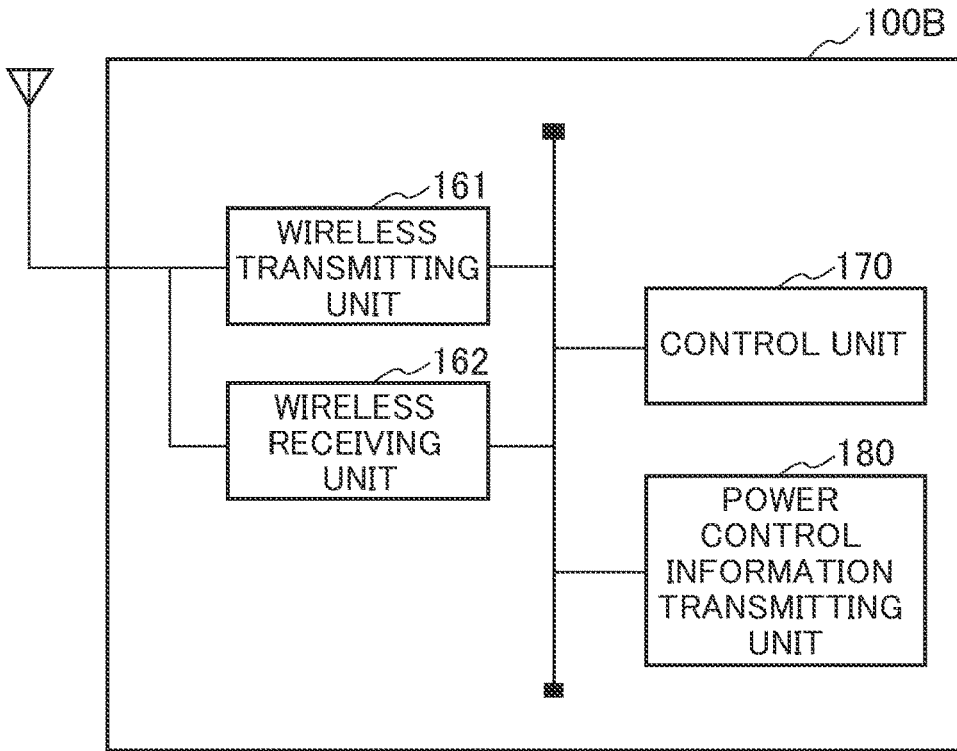
FIG. 4 is a functional block configuration view of a wireless communication node 100B.

FIG. 4 is a functional block configuration view of the wireless communication node 100B that form an IAB node. As illustrated in FIG. 4, the wireless communication node 100B includes a wireless transmitting unit 161, a wireless receiving unit 162, a control unit 170, and a power control information transmitting unit 180.

The wireless transmitting unit 161 transmits a radio signal according to the 5G specifications. In addition, the wireless receiving unit 162 transmits a radio signal according to the 5G specifications. In the present embodiment, the wireless transmitting unit 161 and the wireless receiving unit 162 execute wireless communication with the wireless communication node 100A that forms the parent node and the wireless communication with the child node (including the case of the UE 200).

The control unit 170 executes control of each functional block forming the wireless communication node 100B. In particular, in the present embodiment, the control unit 170 executes control regarding the received power of the MT and the DU.

Specifically, the control unit 170 can set the DL received power target value (downlink target value) which is the target value of the received power of the DL from the parent node (upper node) based on the received power of the UL from the child node (lower node).

Furthermore, the control unit 170 can set a UL received power target value (uplink target value) which is the target value of the received power of the UL from the child node based on the received power of the DL from the parent node.

Note that the control unit 170 may set the DL received power target value and the UL received power target value based on the capabilities (performance) of the wireless transmitting unit 161 and the wireless receiving unit 162, actual UL and DL received power values, and the like.

The DL received power target value merely needs to be set based on the value of the actual UL received power from the child node (lower node), and may be the same as the UL received power or within a predetermined range based on the UL received power.

Similarly, the UL received power target value merely needs to be set based on the value of the actual DL received power from the parent node, and may be the same as the DL received power or within a predetermined range based on the DL received power.

Furthermore, the DL received power target value and the UL received power target value are not limited to those that directly indicate the target value, and merely need to be values used for adjusting the power.

The control unit 170 may match the UL received power target value with the DL received power target value. Specifically, the control unit 170 may match the UL received power target value with the DL received power target value when the communication speed (may be referred to as transmission speed, data rate or simply rate, or throughput) or signal-to-noise ratio (SNR) of the DL from the parent node is higher than the communication speed or the SNR of the UL from the child node.

Note that the communication speed here is targeted on information (data) transmitted via the DL, the DL received power is targeted on the entire subcarrier set for the DL, and the SNR may be interpreted as the ratio of the signal power for the entire subcarrier set for the DL and the noise power.

Furthermore, the control unit 170 may match the DL received power target value with the UL received power target value. Specifically, the control unit 170 may match the DL received power target value with the UL received power target value when the communication speed or the SNR of the UL from the child node is higher than the communication speed or the SNR of the DL from the parent node.

Note that the UL received power is targeted on the entire subcarrier set for the UL, and the SNR is interpreted as the ratio of the signal power for the entire subcarrier set for the UL and the noise power.

The power control information transmitting unit 180 transmits power control information to the parent node (upper node) or the child node (lower node). Specifically, the power control information transmitting unit 180 transmits the power control information based on the DL received power target value (downlink target value) to the upper node, specifically, the wireless communication node 100A. In the present embodiment, the power control information transmitting unit 180 constitutes a transmitting unit.

More specifically, the power control information transmitting unit 180 can transmit the power control information indicating the difference between the DL received power target value and the DL received power. As described above, the difference may be interpreted as the difference between the DL received power target value) and the actual DL received power.

Note that the difference may be, for example, a numerical value that directly indicates the power difference between the DL received power target value and the actual DL received power, or may be one that indicates the magnitude of the power difference in a stepwise manner. Furthermore, the difference may be an average value for a predetermined time or an instantaneous value at a predetermined timing.

The power control information transmitting unit 180 may transmit the DL received power target value and the actual DL received power. Alternatively, the power control information transmitting unit 180 may transmit, to the upper node, the target value of the DL transmission power by the upper node.

Furthermore, the power control information transmitting unit 180 may also transmit power control information instructing increase (UP), decrease (DOWN), or maintenance (KEEP) of the DL transmission power based on the set DL received power target value.

Specifically, when the actual DL received power is higher than the DL received power target value, the power control information transmitting unit 180 can transmit power control information instructing DOWN of the DL transmission power, and when the actual DL received power is lower than the DL received power target value, the power control information transmitting unit 180 can transmit power control information instructing UP of the DL transmission power. Furthermore, when the actual DL received power is the same as the DL received power target value, the power control information transmitting unit 180 may transmit the power control information instructing KEEP of the DL transmission power.

The power control information instructing KEEP may be omitted. That is, when the amount of electric power to be changed for each UP and DOWN instruction is defined, and increase or decrease of the transmission power is not necessary, the KEEP instruction is not necessary. Therefore, the power control information transmitting unit 180 may transmit either increase (UP) or decrease (DOWN).

Furthermore, the power control information transmitting unit 180 may also transmit, to the lower node, specifically, the child node or the UE 200, power control information instructing increase (UP), decrease (DOWN), or maintenance (KEEP) of the UL transmission power based on the set UL received power target value.

A specific control method of the UL transmission power based on the UL received power target value may be similar to the control method of the DL transmission power based on the DL received power target value.

Moreover, the power control information transmitted to the parent node (upper node) or the child node (lower node) does not necessarily have to be information directly instructing increase (UP), decrease (DOWN) or maintenance (KEEP), and may be any information as long as the parent node or the child node can control the transmission power.

The power control information transmitting unit 180 may transmit the UL received power target value and the actual UL received power.

(2.3) UE 200

Figure 5:
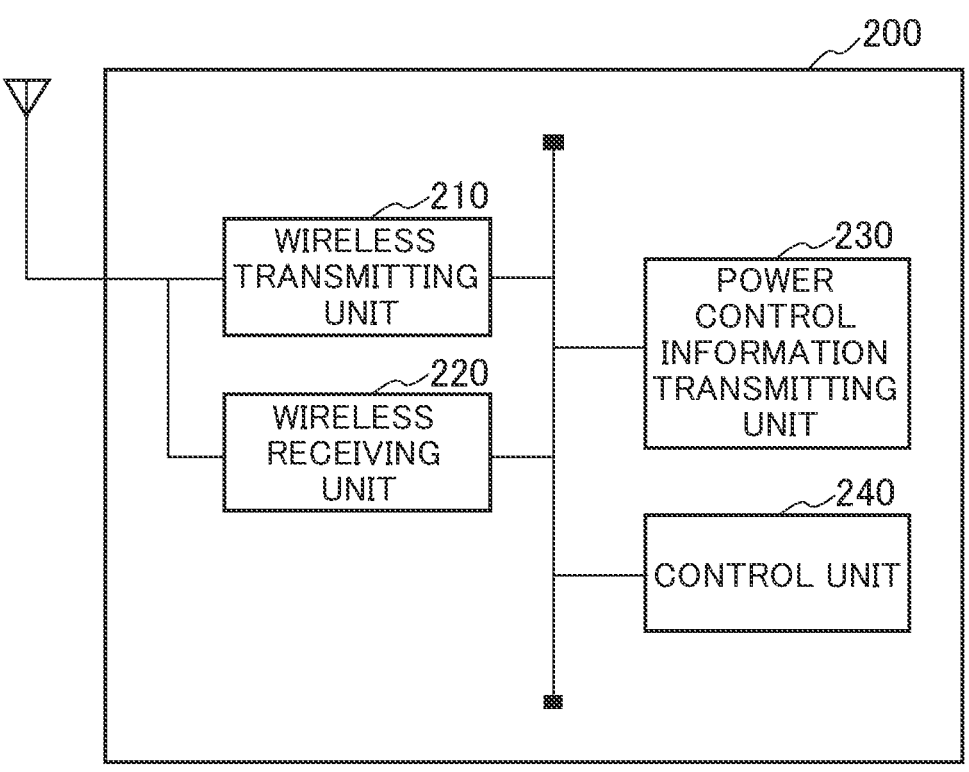
FIG. 5 is a functional block configuration view of a UE 200 that forms a child node.

FIG. 5 is a functional block configuration view of the UE 200 that forms a child node. As illustrated in FIG. 5, the UE

200 includes a wireless transmitting unit 210, a wireless receiving unit 220, a power control information receiving unit 230, and a control unit 240.

The wireless transmitting unit 210 transmits a radio signal according to the 5G specifications. In addition, the wireless receiving unit 220 transmits a radio signal according to the 5G specifications. In the present embodiment, the wireless transmitting unit 210 and the wireless receiving unit 220 execute wireless communication with the wireless communication node 100B that forms the IAB node. The UE 200 may directly communicate with the parent node (wireless communication node 100A).

The power control information receiving unit 230 receives the power control information transmitted from the IAB node. Specifically, the power control information receiving unit 230 can receive power control information instructing increase (UP), decrease (DOWN) or maintenance (KEEP) of the UL transmission power.

The power control information receiving unit 230 may receive the UL received power target value and the actual UL received power.

The control unit 240 executes control of each functional block forming the UE 200. Particularly, in the present embodiment, the control unit 240 controls the UL transmission power based on the power control information received by the power control information receiving unit 230.

(3) Operation of Wireless Communication System

Next, the operation of the wireless communication system 10 will be described. Specifically, the control operation of the received power of the DL and the UL by the IAB node will be described.

(3.1) Multiplexing and Communication Scheme in IAB

Figure 6:
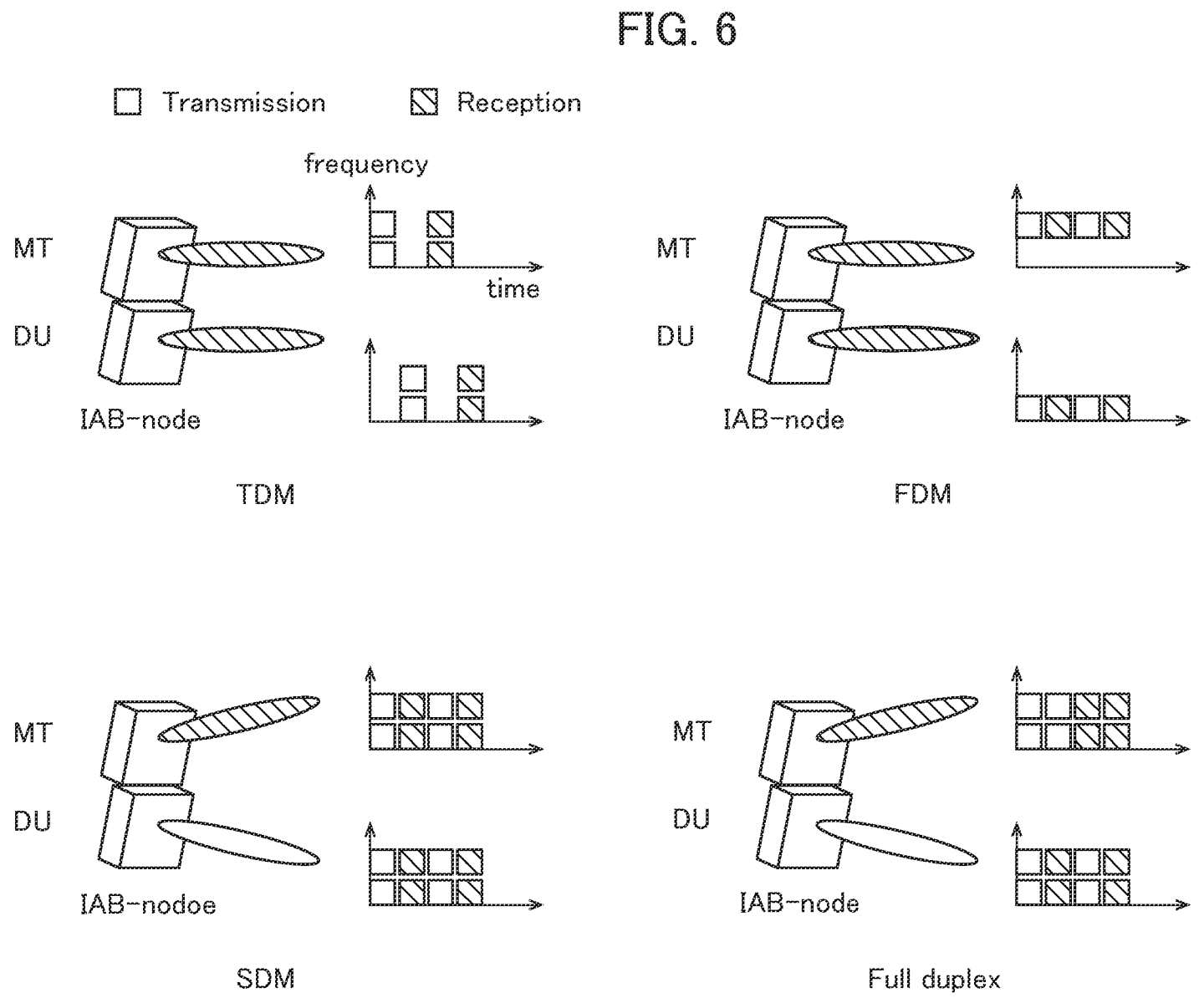

First, multiplexing and communication scheme in the IAB will be described. FIG. 6 is a conceptual view of multiplexing and communication scheme that can be applied in the IAB of 3GPP Release-17.

In 3GPP Release-17, FDM and SDM are applicable in addition to TDM. Furthermore, in 3GPP Release-17, Full-duplex is also applicable.

As illustrated in FIG. 6, in the case of TDM, the same time resource of the radio resources is not shared between the MT and the DU in the IAB node.

On the other hand, in the case of FDM and SDM, the same time resource can be shared between the MT and the DU in the IAB node. That is, in the IAB node, MT transmission (UL Parent BH) and DU transmission (DL Access or DL Child BH), or MT reception (DL Parent BH) and DU reception (UL Access or UL Child BH) are executed using the same time resource.

(3.2) Issues when Using the Same Time Resources in the IAB Node

As described above, when the IAB node uses the same time resource in the MT and the DU, that is, when the MT and the DU operate simultaneously, a difference may occur between the DL received power of the MT and the UL received power of the DU.

Here, if the difference between the DL received power and the UL received power is large, a radio signal with low received power cannot be normally received.

Figures 7, 8:
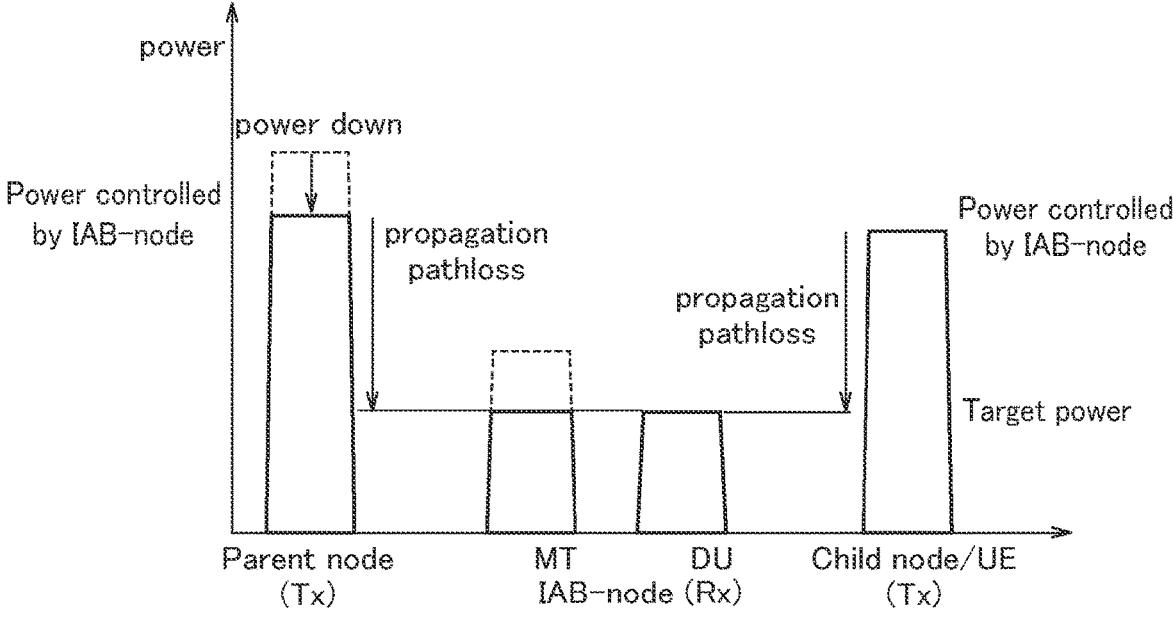
FIG. 7 is a view illustrating an example in which a difference occurs between a DL received power of an MT and a UL received power of a DU.
FIG. 8 is a view illustrating a control example of the DL received power of the MT and the UL received power of the DU according to operation example 1 (when UL received power of DU<DL received power of MT).

FIG. 7 illustrates an example in which a difference has occurred between the DL received power of the MT and the UL received power of the DU. As illustrated in FIG. 7, when a large difference occurs between the DL received power of the MT and the UL received power of the DU, a radio signal with high received power (in the example of FIG. 7, the DL received power of the MT) interferes with a radio signal with low received power (UL received power of the DU).

Furthermore, when the receiver is shared between the MT and the DU in the IAB node, a radio signal with low received power may fall out of the receivable range if the receiver is adjusted to a radio signal with high received power.

(3.3) Operation Example

Hereinafter, an operation example for solving the above-mentioned problem will be described. Specifically, an operation example will be described in which when the MT and the DU of the IAB node operate simultaneously (use the same time resource), the DL received power of the MT and the UL received power of the DU are equalized to enable simultaneous reception of the MT and the DU.

(3.3.1) Outline

The IAB node can operate as follows.
(i) Semi-Static Power Control of Wireless Backhaul The IAB node sets the target value of the DL received power of the MT (DL received power target value) based on the UL received power of the DU and notifies the parent node (upper node) of the difference between the target value and the actual DL received power.
(ii) Dynamic Power Control of Wireless Backhaul The IAB node sets the target value of the DL received power of the MT (DL received power target value) based on the UL received power of the DU, and notifies an instruction to increase (UP), decrease (DOWN) or maintain (KEEP) the DL transmission power of the parent node (upper node) depending on the difference between the target value and the actual DL received power.
(iii) Dynamic Power Control of Radio Access The IAB node sets the target value of the UL received power of the DU (UL received power target value) based on the DL received power of the MT, and notifies an instruction to increase (UP), decrease (DOWN) or maintain (KEEP) the UL transmission power of the child node (or the UE 200) depending on the difference between the target value and the actual UL received power.
(iv) Method for Setting Received Power Target Values of Wireless Backhaul and Radio Access
  Match with the target value for UL power control (case (ii) above).
  Match with received power of higher required data rate or SNR in radio access and wireless backhaul.
  Match with one with higher target value.
  Match with one with lower target value.

(3.3.2) Operation Example 1

In the present operation example, the IAB node semi-statically instructs the DL transmission power of the parent node (upper node, hereinafter the same) in order to keep the DL received power of the MT and the UL received power of the DU of the IAB node within the predetermined range.

The IAB node sets a value that is equivalent to the target value or the actual UL received power as the target value of the DL received power of the MT (DL received power target value) based on the target value of the UL received power of the DU or the actual UL received power.

The IAB node may notify the parent node of at least one of the set target value, the difference from the actual DL received power, and the DL transmission power of the parent node (which may be expressed as power control information including these) (see FIG. 2).

The parent node controls the DL transmission power based on the notified power control information, the target data rate of the wireless backhaul, the SNR, and the like. For radio access, the UE power control of 3GPP Release 15 may be applied.

Figure 9:
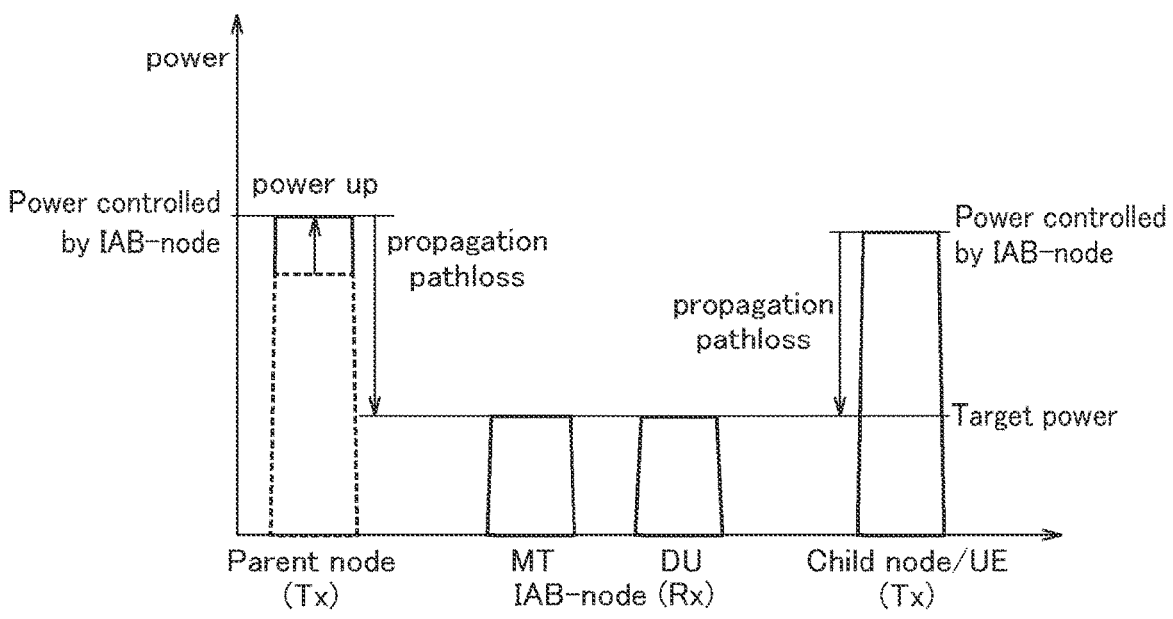
FIG. 9 is a view illustrating a control example of the DL received power of the MT and the UL received power of the DU according to operation example 1 (when UL received power of DU>DL received power of MT).

FIG. 8 illustrates a control example of the DL received power of the MT and the UL received power of the DU according to operation example 1 (when UL received power of DU<DL received power of MT). FIG. 9 illustrates a control example of the DL received power of the MT and the UL received power of the DU according to operation example 1 (when UL received power of DU>DL received power of MT).

In the example illustrated in FIG. 8, in a case where UL received power of the DU<DL received power of the MT, the UL received power of the DU and the DL received power of the MT are equalized by decreasing (DOWN) the DL received power of the MT.

In the example illustrated in FIG. 9, in a case where UL received power of the DU>DL received power of the MT, the UL received power of the DU and the DL received power of the MT are equalized by increasing (UP) the DL received power of the MT.

The notification of the power control information may be realized by any of the following.

(i) The IAB node adds power control information regarding the DL transmission power of the MT of the parent node to the UE capability information.

(ii) The IAB node adds power control information regarding the DL transmission power of the MT of the parent node to a measurement report of the SS (Synchronization Signal) or the CSI (Channel State Information).

Furthermore, the notification of the power control information may include the following contents, as described above.

(i) The DL received power target value of the IAB node and the actual DL received power.

(ii) Difference between the DL received power target value of the IAB node and the actual DL received power.

(iii) DL transmission power target value of the parent node (may be calculated using the difference between the ss-PBCH-BlockPower notified from the parent node and the actual DL received power).

Figure 10:
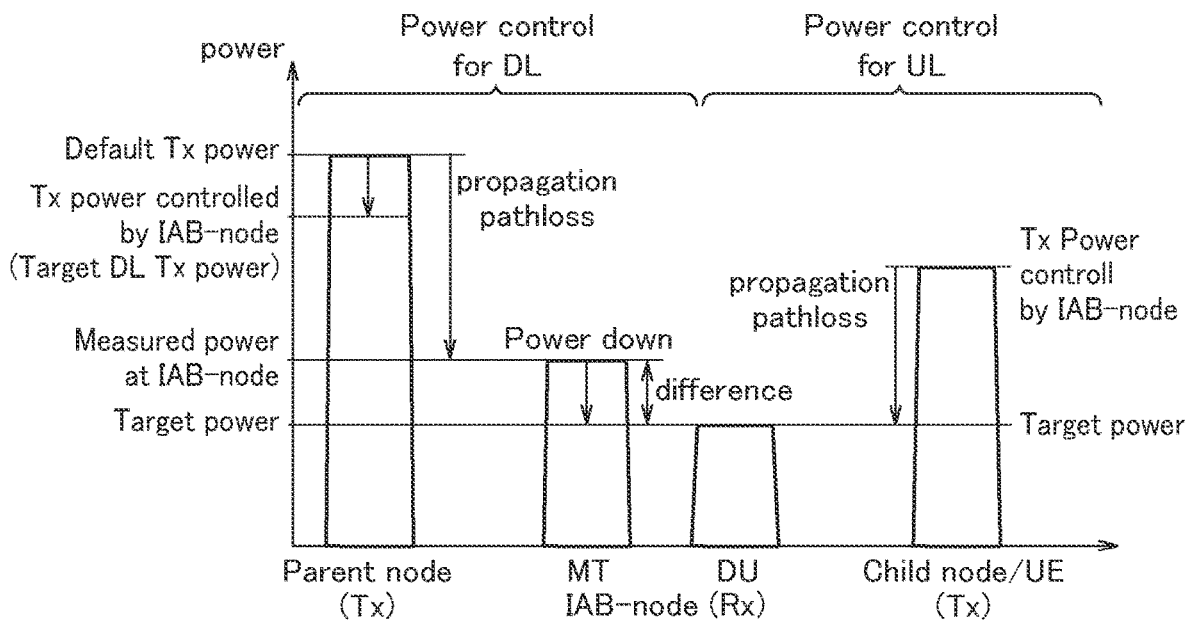
FIG. 10 is a view illustrating a control example of the DL received power of the MT and the UL received power of the DU according to operation example 1 (including DL transmission power target value, measurement UL received power value, DL received power target value, etc.).

FIG. 10 illustrates a control example of the DL received power of the MT and the UL received power of the DU according to operation example 1 (including DL transmission power target value, measurement UL received power value, DL received power target value, etc.).

As illustrated in FIG. 10, power control for DL is executed between the parent node and the MT of the IAB node. Furthermore, power control for UL is executed between the DU of the IAB node and the child node/UE. As illustrated in FIG. 10, the DL transmission power target value and the DL received power target value may coexist.

(3.3.3) Operation Example 2

In the present operation example, the IAB node dynamically instructs the DL transmission power of the parent node to have the DL received power of the MT and the UL received power of the DU of the IAB node within the predetermined range. Hereinafter, a part different from operation example 1 will be mainly described.

The IAB node may notify the parent node of the instruction to increase (UP), decrease (DOWN) or maintain (KEEP) the DL transmission power of the parent node depending on the difference between the set target value (DL received power target value) and the actual DL received power.

The parent node controls the DL transmission power based on the notified power control information (UP, DOWN or KEEP), the target data rate of the wireless backhaul, the SNR, and the like.

The notification of the power control information may be realized by any of the following.

(i) Use UCI (Uplink Control Information).

(ii) Use MAC-CE (Medium Access Control-Control Element).

In case of (i), the bit for DL-TPC (Transmit Power Control) is added to the bit for HARQ-ACK (Hybrid Automatic repeat request-Acknowledgement), SR (Scheduling Request) or CSI defined in 3GPP Release 15/16.

In addition, a single bit of DL-TPC may be added, or following the three combinations defined in 3GPP Release 15/16, a combination of HARQ-ACK, SR and DL-TPC, and HARQ-ACK, CSI and DL-TPC may be added. Alternatively, a combination of bits of HARQ-ACK, SR, CSI and DL-TPC may be added.

FIG. 11 illustrates a setting example (part 1) of the DL-TPC according to operation example 2. Specifically, FIG. 11 illustrates an example of a case where information on DL-TPC is independently added to 3GPP Release 15/16 (TS38.212) (see underlined portion). As illustrated in FIG. 11, a bit for DL-TPC may be newly defined alone.

FIG. 12 illustrates a setting example (part 2) of the DL-TPC according to operation example 2. As illustrated in FIG. 12, a bit for DL-TPC may be defined together with HARQ-ACK and SR.

FIG. 13 illustrates a setting example (part 3) of the DL-TPC according to operation example 2. As illustrated in FIG. 13, a bit for DL-TPC may be defined together with HARQ-ACK, SR and CSI.

In the case of (ii), the Reserved index of MAC-CE may be used.

FIG. 14 illustrates a setting example (part 4) of the DL-TPC according to operation example 2. As illustrated in FIG. 14, the DL-TPC may be notified using a reserved index (Reserved) of the indexes for LCID (Logical Channel ID).

Furthermore, the reporting timing of the power control information (DL-TPC) may be any of the following.

(i) The child node reports at an arbitrary timing triggered by a change in the target value of power.

(ii) The parent node designates a reporting period.

(iii) The parent node dynamically triggers.

(3.3.4) Operation Example 3

In the present operation example, the IAB node utilizes a mechanism of power control of 3GPP Release 15 and dynamically instructs the UL transmission power of the child node to have the DL received power of the MT and the UL received power of the DU of the IAB node within the predetermined range.

The IAB node sets a value equivalent to the DL received power as a target value of the UL received power of the DU (UL received power target value), based on the actual DL received power of the MT.

The IAB node may notify the child node of the instruction to increase (UP), decrease (DOWN) or maintain (KEEP) the UL transmission power of the child node depending on the difference between the set target value (UL received power target value) and the actual UL received power.

The child node controls the UL transmission power based on the notified power control information (UP, DOWN or KEEP), the target data rate of the wireless backhaul, the SNR and the like.

Figure 15:
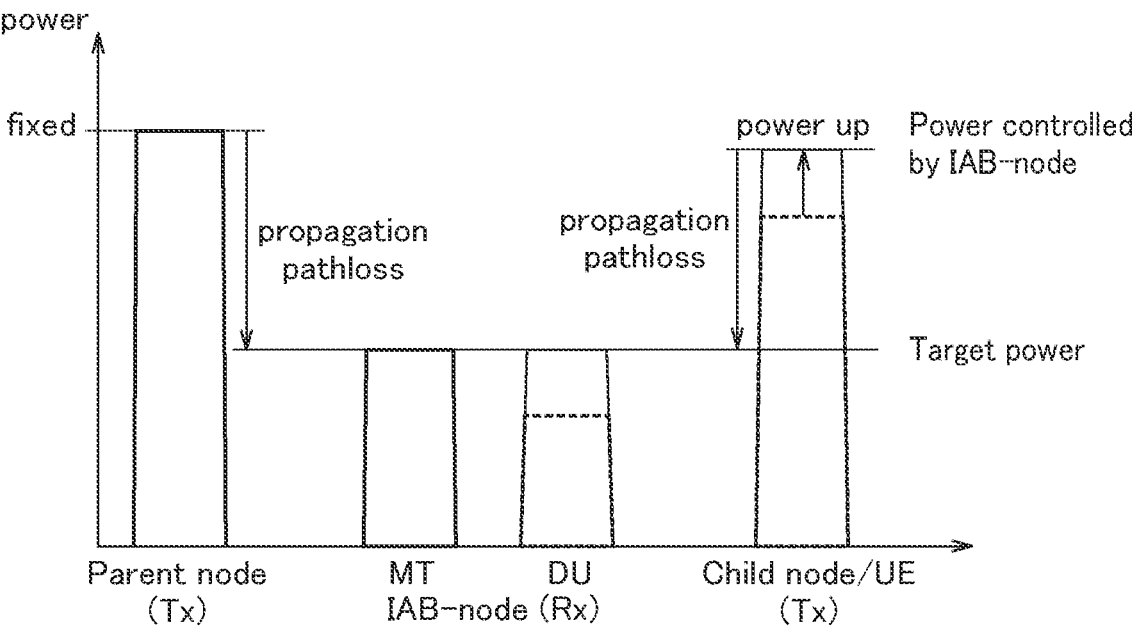
FIG. 15 is a view illustrating a control example of the DL received power of the MT and the UL received power of the DU according to operation example 3.

FIG. 15 illustrates a control example of the DL received power of the MT and the UL received power of the DU according to operation example 3. In the example illustrated in FIG. 15, the UL received power of the DU and the DL received power of the MT are equalized by increasing (UP) the UL transmission power of the child node.

(3.3.5) Operation Example 4

In the present operation example, the IAB node sets the received power target values of the wireless backhaul and the radio access.

Specifically, the target values (DL received power target value or UL received power target value) of the received power used for the DL transmission power control and the UL transmission power control may be set by one of the followings, as described above.

(i) Match with target value for UL power control (in case of operation example 2).

(ii) Match with received power of higher required data rate or SNR in radio access and wireless backhaul.

(iii) Match with one with higher target value.

(iv) Match with one with lower target value.

In case of (ii), the power control of the wireless backhaul is executed in operation example 1 or operation example 2. That is, the parent node controls the DL transmission power based on the instruction (power control information) notified from the IAB node, the required data rate in the wireless backhaul, the SNR, and the like.

As a result of the DL transmission power control, when the IAB node detects a DL received power higher than the DL received power expected by the IAB node, the DL received power may be set as the target value of the UL received power for radio access.

In (iii), the IAB node executes power control on the child node when the DL received power of the MT>UL received power of the DU in the IAB node, and executes power control on the parent node to match with the higher target value when the DL received power of the MT<UL received power of the DU.

In (iv), the IAB node executes power control on the child node when the DL received power of the MT<UL received power of the DU in the IAB node, and executes power control on the parent node to match with the lower target value when the DL received power of the MT>UL received power of the DU.

(4) Operation/Effect

According to the embodiment described above, the following operations and effects are obtained. Specifically, the wireless communication node 100B (IAB node) can set the target value of the DL received power from the parent node (upper node) (DL received power target value) based on the UL received power from the child node (lower node), and transmit the power control information based on the target value to the parent node, specifically, the wireless communication node 100A.

Therefore, even when the MT and the DU of the IAB node operate simultaneously by applying FDM, SDM or Full-duplex, that is, receive radio signals using the same time resource, the difference between the DL received power and the UL received power in the IAB node can be maintained within a predetermined range.

Thus, a state in which the radio signal with low received power cannot be normally received (interference or deviation from the reception level detectable range) can be reliably avoided. That is, according to the wireless communication node 100B, the radio signal can be normally received in the IAB even when the MT and the DU simultaneously operate.

In the present embodiment, the wireless communication node 100B can transmit, to the parent node, the power control information indicating the difference between the DL received power target value and the DL received power. Therefore, the parent node can execute DL transmission power control more reliably.

In the present embodiment, the wireless communication node 100B can transmit power control information instructing increase (UP), decrease (DOWN), or maintenance (KEEP) of the DL transmission power based on the set DL received power target value. Therefore, the parent node can execute more reliable and precise DL transmission power control.

In the present embodiment, the wireless communication node 100B can set the target value of the UL received power from the child node (UL received power target value) based on the DL received power from the parent node, and transmit, to the lower node, specifically, the child node or the UE 200, the power control information instructing increase (UP), decrease (DOWN) or maintenance (KEEP) of the UL transmission power based on the set UL received power target value. Therefore, the lower node can execute reliable and precise UL transmission power control.

In the present embodiment, the wireless communication node 100B can match the UL received power target value with the DL received power target value when the communication speed or the SNR of the DL from the parent node is higher than the communication speed or the SNR of the UL from the child node, and can match the DL received power target value with the UL received power target value when the communication speed or the SNR of the UL from the child node is higher than the communication speed or the SNR of the DL from the parent node.

Therefore, appropriate DL transmission power control and UL transmission power control depending on the situations of the DL and the UL can be realized.

(5) Other Embodiments

Although the embodiment has been described above, it is obvious to those skilled in the art that the present invention is not limited to the description of the embodiment and various modifications and improvements can be made.

For example, in the embodiment described above, names such as parent node, IAB node, and child node were used, but the names may be differed only when the configuration of the wireless communication node in which the wireless backhaul between wireless communication nodes such as gNB and the radio access with the terminal are integrated is adopted. For example, it may be simply referred to as a first node, a second node, and the like, or may be referred to as an upper node, a lower node or a relay node, an intermediate node, and the like.

Furthermore, the wireless communication node may be simply referred to as a communication device or a communication node, or may be read as a radio base station.

In the embodiment described above, the terms downlink (DL) and uplink (UL) are used, but they may be called in other terms. For example, the terms may be replaced or associated with terms such as forward ring, reverse link, access link, and backhaul. Alternatively, terms such as a first link, a second link, a first direction, ae second direction, etc. may be simply used.

Moreover, the block configuration views used for explaining the above embodiments (FIGS. 3 to 5) illustrate blocks of functional unit. Those functional blocks (structural components) can be realized by an arbitrary combination of at least one of hardware and software. The method for realizing each functional block is not particularly limited. That is, each functional block may be realized by one device combined physically or logically, or two or more devices separated physically or logically may be directly or indirectly connected (e.g., wired, or wireless) to each other and such plural devices may be used to realize each functional block. The functional blocks may be realized by combining software with the one device or the plural devices mentioned above.

Functions include judging, determining, deciding, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like, but are not limited thereto. For example, a functional block (structural component) that causes transmission may be referred to as a transmitting unit or a transmitter. For any of the above, as explained above, the method for realizing is not particularly limited to any one method.

Figure 16:
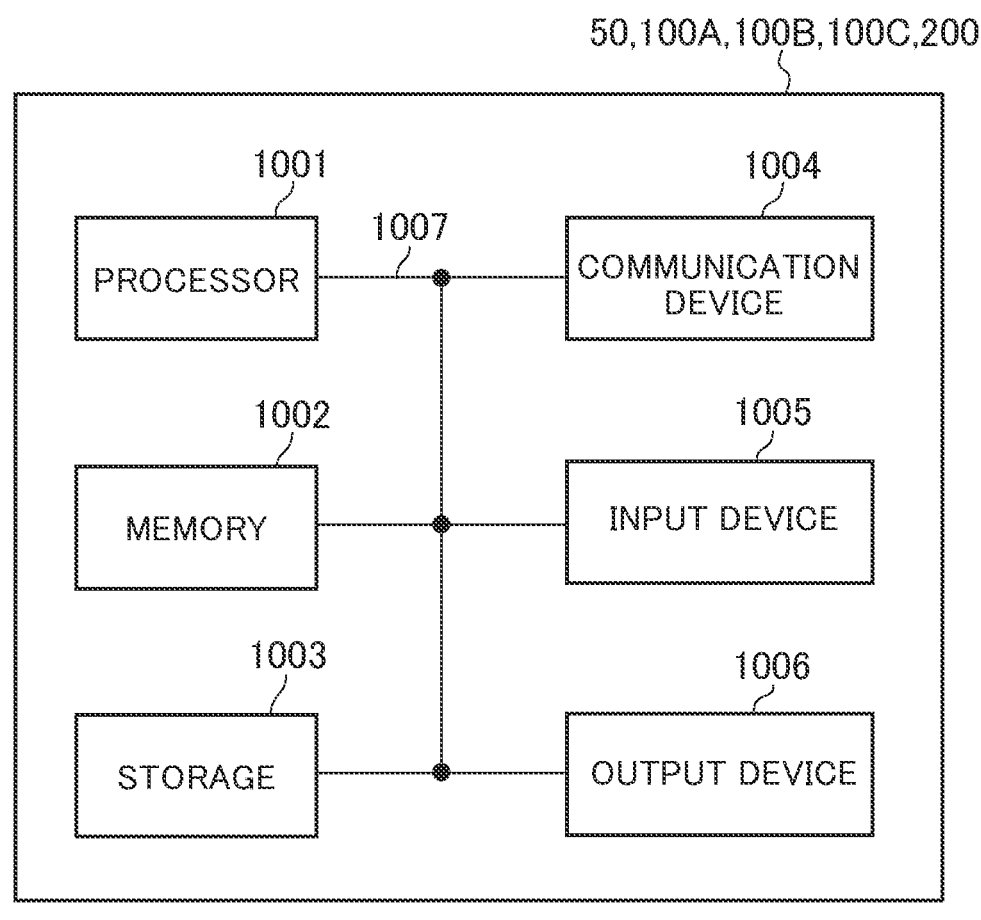
FIG. 16 is a view illustrating an example of a hardware configuration of a CU 50, wireless communication nodes 100A to 100C, and a UE 200.

Furthermore, the CU 50, the wireless communication nodes 100A to 100C, and the UE 200 (the device) described above may function as a computer that performs the process of the wireless communication method of the present disclosure. FIG. 16 is a view illustrating one example of a hardware configuration of the device. As illustrated in FIG. 16, the device may be configured as a computer device including a processor 1001, a memory 1002, a storage 1003, a communication device 1004, an input device 1005, an output device 1006, a bus 1007, and the like.

Furthermore, in the following explanation, the term "device" can be read as a circuit, device, unit, and the like. The hardware configuration of the device may be configured by including one or a plurality of the devices illustrated in the figure, or may be configured by without including some of the devices.

Each functional block (see FIGS. 3 to 5) of the device can be realized by any of the hardware elements of the computer device or a combination of the hardware elements.

Moreover, the processor 1001 performs computing by loading a predetermined software (computer) on hardware such as the processor 1001 and the memory 1002, and various functions of the device are realized by controlling communication via the communication device 1004 and controlling at least one of read or write of data on the memory 1002 and the storage 1003.

The processor 1001, for example, operates an operating system to control the entire computer. The processor 1001 may be configured with a central processing unit (CPU) including an interface with a peripheral device, a control device, a computing device, a register, and the like.

Moreover, the processor 1001 reads a program (program code), a software module, data, and the like from at least one of the storage 1003 and the communication device 1004 into the memory 1002, and executes various processes according to the data. As the program, a program that causes a computer to execute at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be referred to as register, cache, main memory (main storage device), and the like. The memory 1002 can save therein a program (program codes), software modules, and the like that can execute the method according to one embodiment of the present disclosure.

The storage 1003 is a computer readable recording medium and is configured, for example, with at least one of an optical disk such as Compact Disc ROM (CD-ROM), a hard disk drive, a flexible disk, a magneto-optical disk (e.g., a compact disk, a digital versatile disk, Blu-ray (Registered Trademark) disk), a smart card, a flash memory (e.g., a card, a stick, a key drive), a floppy (Registered Trademark) disk, a magnetic strip, and the like. The storage 1003 can be referred to as an auxiliary storage device. The recording medium described above can be, for example, a database including at least one of the memory 1002 and the storage 1003, a server, or other appropriate medium.

The communication device 1004 is hardware (transmitting/receiving device) for performing communication between computers through at least one of a wired network or a wireless network, and is also referred to as, for example, a network device, a network controller, a network card, a communication module, and the like.

The communication device 1004 may be configured to include a high-frequency switch, a duplexer, a filter, a frequency synthesizer, and the like in order to realize, for example, at least one of Frequency Division Duplex (FDD) and Time Division Duplex (TDD).

The input device 1005 is an input device (e.g., a keyboard, a mouse, a microphone, a switch, a button, a sensor, and the like) that accepts input from the outside. The output device 1006 is an output device (e.g., a display, a speaker, an LED lamp, and the like) that outputs data to the outside. Note that, the input device 1005 and the output device 1006 may be integrated (e.g., a touch screen).

In addition, the respective devices, such as the processor 1001 and the memory 1002, are connected to each other with the bus 1007 for communicating information. The bus 1007 may be formed using a single bus or may be formed using different buses between the devices.

Furthermore, the device may be configured to include hardware such as a microprocessor, a digital signal processor (Digital Signal Processor: DSP), Application Specific Integrated Circuit (ASIC), Programmable Logic Device (PLD), and Field Programmable Gate Array (FPGA), and some or all of these functional blocks may be realized by the hardware. For example, the processor 1001 may be implemented using at least one of these hardware.

Notification of information is not limited to the aspect/embodiment described in the present disclosure, and may be performed using a different method. For example, the notification of information may be performed by physical layer signaling (e.g., Downlink Control Information (DCI), Uplink Control Information (UCI), upper layer signaling (e.g., RRC signaling, Medium Access Control (MAC) signaling, notification information (Master Information Block (MIB), System Information Block (SIB)), other signals, or a combination thereof. The RRC signaling may be referred to as RRC message, for example, and may be RRC Connection Setup message, RRC Connection Reconfiguration message, or the like.

Each aspect/embodiment described in the present disclosure may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system expanded based on the above. Furthermore, a plurality of systems may be combined (e.g., a combination of at least one of the LTE and the LTE-A and the 5G).

As long as there is no inconsistency in the processing procedure, sequence, flowchart, and the like of each aspect/embodiment described in the present disclosure, the order may be interchanged. For example, elements of various steps have been mentioned using an exemplary order in the method described in the present disclosure, but they are not limited to the specific order mentioned above.

The specific operation assumed to be performed by the base station in the present disclosure may be performed by its upper node in some cases. In a network including one or more network nodes having a base station, it is apparent that the various operations performed for communication with the terminal may be performed by at least one of the base station and another network node other than the base station (e.g., MME, S-GW, etc. may be considered, but not limited thereto). A case where there is one network node other than the base station has been described above, but a combination of a plurality of other network nodes (e.g., MME and S-GW) may be adopted.

Information and signals (information etc.) can be output from the upper layer (or lower layer) to the lower layer (or upper layer). The information and the like may be input and output via a plurality of network nodes.

The input/output information can be saved in a specific location (e.g., a memory) or can be managed using a management table. The information to be input/output can be overwritten, updated, or added. The output information can be deleted. The input information can be transmitted to another device.

The decision may be made by a value (0 or 1) represented by one bit or by a truth value (Boolean: true or false), or may be made by comparison of numerical values (e.g., comparison with a predetermined value).

Each aspect/embodiment described in the present disclosure may be used alone or in combination, or may be switched in accordance with the execution. Furthermore, notification of predetermined information (e.g., notification of "being X") is not limited to being performed explicitly, and may be performed implicitly (e.g., without notifying the predetermined information).

Regardless of whether being referred to as software, firmware, middleware, microcode, hardware description language, or some other names, software should be interpreted broadly to mean instruction, instruction set, code, code segment, program code, program, subprogram, software module, application, software application, software package, routine, subroutine, object, executable file, execution thread, procedure, function, and the like.

Furthermore, software, instruction, information, and the like may be transmitted and received via a transmission medium. For example, when software is transmitted from a website, a server, or some other remote source using at least one of a wired technology (coaxial cable, optical fiber cable, twisted pair, Digital Subscriber Line (DSL), or the like) and a wireless technology (infrared light, microwave, or the like), at least one of these wired and wireless technologies is included within the definition of the transmission medium.

Information, signals, or the like described in the present disclosure may be represented using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or an arbitrary combination thereof.

It should be noted that the terms described in the present disclosure and the terms necessary for understanding the present disclosure may be replaced with terms having the same or similar meanings. For example, at least one of a channel and a symbol may be a signal (signaling). Furthermore, a signal may be a message. Moreover, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure may be represented by an absolute value, may be represented using a relative value from a predetermined value, or may be represented using other corresponding information. For example, the radio resource can be indicated by an index.

The name used for the above parameter should not be restrictive in any respect. In addition, formulas and the like that use these parameters may be different from those explicitly disclosed in the present disclosure. As the various channels (e.g., PUCCH, PDCCH, etc.) and information element can be identified by any suitable name, the various names assigned to these various channels and information elements should not be restrictive in any aspect.

In the present disclosure, terms such as "base Station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (e.g., three) cells (also referred to as sectors). In a case where the base station accommodates a plurality of cells, the entire coverage area of the base station can be divided into a plurality of smaller areas, and each of such smaller areas can provide a communication service by a base station subsystem (e.g., a small base station for indoor use (Remote Radio Head: RRH)).

The term "cell" or "sector" refers to a part of or all of the coverage area of at least one of a base station and a base station subsystem that performs a communication service in the relevant coverage.

In the present disclosure, the terms "mobile station (MS)", "user terminal", "user equipment (UE)", "terminal" and the like can be used interchangeably.

The mobile station is sometimes called by the persons skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be referred to as a transmitting device, a receiving device, a communication device, or the like. Note that, at least one of the base station and the mobile station may be a device mounted on a moving body, a moving body itself, or the like. The moving body may be a vehicle (e.g., a car, an airplane, etc.), a moving body that moves unmanned (e.g., a drone, an automatically driven vehicle, etc.), or a robot (manned type or unmanned type). At least one of the base station and the mobile station also includes a device that does not necessarily move at the time of the communication operation. For example, at least one of the base station and the mobile station may be an Internet of Things (IoT) device such as a sensor.

Furthermore, a base station in the present disclosure may be read as a mobile station (user terminal, hereinafter the same). For example, the configuration in which the communication between the base station and the mobile station is replaced by a communication between a plurality of mobile stations (e.g., may be referred to as Device-to-Device (D2D), Vehicle-to-Everything (V2X), etc.) may be applied with each aspects/embodiment of the present disclosure. In this case, the mobile station may have the function of the base station. Words such as "uplink" and "downlink" may also be read with words corresponding to inter-terminal communication (e.g., "side"). For example, an uplink channel, a downlink channel, or the like may be read as a side channel.

Similarly, the mobile station in the present disclosure may be read as a base station. In this case, the base station may have the function of the mobile station.

A radio frame may be formed by one or more frames in the time domain. Each frame or frames in the time domain may be referred to as a subframe. A subframe may also be formed by one or more slots in the time domain. The subframe may have a fixed time length (e.g., 1 ms) that does not depend on numerology.

The numerology may be a communication parameter applied to at least one of transmission and reception of a certain signal or channel. Numerology may indicate at least one of, for example, subcarrier spacing (SCS), bandwidth, symbol length, cyclic prefix length, transmission time interval (TTI), number of symbols per TTI, radio frame configuration, specific filtering process performed by a transmitter/receiver in a frequency domain, specific windowing process performed by a transmitter/receiver in the time domain, and the like.

A slot may be configured by one or more symbols (Orthogonal Frequency Division Multiplexing (OFDM)

symbols, Single Carrier Frequency Division Multiple Access (SC-FDMA) symbols, etc.) in the time domain. A slot may be a time unit based on numerology.

The slot may include a plurality of minislots. Each minislot may be formed by one or more symbols in the time domain. The minislot may also be referred to as a subslot. A minislot may be formed by fewer number of symbols than the slot. The PDSCH (or PUSCH) transmitted in a time unit larger than a minislot may be referred to as PDSCH (or PUSCH) mapping type A. The PDSCH (or PUSCH) transmitted using the minislot may be referred to as PDSCH (or PUSCH) mapping type B.

The radio frame, subframe, slot, minislot, and symbol all represent a time unit for transmitting a signal. The radio frame, subframe, slot, minislot, and symbol may have different names corresponding to thereto.

For example, one subframe may be referred to as a transmission time interval (TTI), a plurality of consecutive subframes may be referred to as TTI, and one slot or one minislot may be referred to as TTI. That is, at least one of the subframe and the TTI may be a subframe in the existing LTE (1 ms), a period shorter than 1 ms (e.g., 1 to 13 symbols), or a period longer than 1 ms. The unit representing TTI may be referred to as a slot, a minislot, and the like instead of a subframe.

Here, TTI refers to, for example, the minimum time unit of scheduling in the wireless communication. For example, in the LTE system, the base station performs scheduling to allocate the radio resource (frequency bandwidth, transmission power etc. that can be used in each user terminal) in units of TTI to each user terminal. The definition of TTI is not limited thereto.

The TTI may be a transmission time unit of a channel-encoded data packet (transport block), a code block, a codeword, or the like, or a processing unit such as scheduling, link adaptation, or the like. When a TTI is given, the time interval (e.g., the number of symbols) in which transport block, code block, codeword, and the like are actually mapped may be shorter than the TTI.

When one slot or one minislot is referred to as TTI, one or more TTIs (i.e., one or more slots or one or more minislots) may be the minimum time unit of scheduling. Furthermore, the number of slots (the number of minislots) forming the minimum time unit of the scheduling may be controlled.

The TTI having a time length of 1 ms may be referred to as usual TTI (TTI in LTE Rel. 8-12), normal TTI, long TTI, usual subframe, normal subframe, long subframe, slot, and the like. The TTI shorter than the usual TTI may be referred to as shortened TTI, short TTI, partial TTI (partial or fractional TTI), shortened subframe, short subframe, minislot, subslot, slot, and the like.

Note that the long TTI (e.g., usual TTI, subframe, etc.) may be read as a TTI having a time length of more than 1 ms, and the short TTI (e.g., shortened TTI) may be read as a TTI having a TTI length of less than the TTI length of the long TTI and greater than or equal to 1 ms.

The resource block (RB) is a resource allocation unit in the time domain and the frequency domain, and may include one or more continuous subcarriers in the frequency domain. The number of subcarriers included in the RB may be the same regardless of the numerology, and may be, for example, 12. The number of subcarriers included in the RB may be determined based on numerology.

Furthermore, the time domain of the RB may include one or more symbols, and may be have a length of one slot, one minislot, one subframe, or one TTI. One TTI, one subframe, and the like may be configured by one or more resource blocks.

Note that one or more RBs may be referred to as physical resource blocks (Physical RB: PRB), subcarrier groups (Sub-Carrier Group: SCG), resource element groups (Resource Element Group: REG), PRB pairs, RB pairs, and the like.

Furthermore, the resource block may be configured by one or more resource elements (Resource Element: RE). For example, one RE may be a radio resource region of one subcarrier and one symbol.

A bandwidth Part (BWP) (may also be referred to as partial bandwidth) may represent a subset of consecutive common RB (common resource blocks) for a certain neurology in a certain carrier. Here, the common RB may be specified by the index of the RB based on the common reference point of the carrier. The PRB may be defined in a BWP and numbered within that BWP.

The BWP may include a BWP for UL (UL BWP) and a BWP for DL (DL BWP). One or more BWPs may be set in one carrier for the UE.

At least one of the set BWPs may be active and the UE may not assume to transmit or receive a predetermined signal/channel outside the active BWP. Note that "cell", "carrier", and the like in the present disclosure may be read as "BWP".

The structures of the radio frame, subframe, slot, minislot, symbol, and the like described above are merely examples. For example, configurations such as the number of subframes included in a radio frame, the number of slots per subframe or radio frame, the number of minislots included in a slot, the number of symbols and RBs included in a slot or minislot, the number of subcarriers included in the RB, the number of symbols in the TTI, the symbol length, the cyclic prefix (CP) length, and the like can be variously changed.

The terms "connected", "coupled", or any variations thereof mean any direct or indirect connection or coupling between two or more elements, and one or more intermediate elements may exist between two elements "connected" or "coupled" to each other. The coupling or connection between the elements may be physical, logical, or a combination thereof. For example, "connection" may be read as "access". When used in the present disclosure, it can be considered that two elements are "connected" or "coupled" to each other by using at least one of one or more electric wires, cables, and printed electrical connections, and using electromagnetic energy having wavelengths in the radio frequency domain, the microwave range and optical (both visible and invisible) domain, and the like as some non-limiting and non-inclusive examples.

The reference signal may be abbreviated as Reference Signal (RS) and may be referred to as pilot (Pilot) according to the applied standard.

The phrase "based on" as used in the present disclosure does not mean "based only on" unless clearly stated otherwise. In other words, the phrase "based on" means both "based only on" and "based at least on".

The "means" in the configuration of each of the above devices may be replaced with "unit", "circuit", "device", and the like.

Any reference to an element using designations such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some manner.

In the present disclosure, when "include", "including", and variations thereof are used, these terms are intended to be inclusive in a manner similar to the term "comprising". Furthermore, the term "or" used in the present disclosure is intended not to be an exclusive disjunction.

Throughout the present disclosure, for example, if articles such as "a", "an", and "the" in English are added due to translation, the present disclosure may include cases where the noun following these articles is in plurals.

The terms "judging" and "determining" as used in the present disclosure may include a wide variety of operations. "Judging" and "determining" may include, for example, regarding deciding, calculating, computing, processing, deriving, investigating, searching (looking up, search, inquiry) (e.g., searching in a table, a database, or another data structure), ascertaining, and the like as "judging" and "determining". Furthermore, "judging" and "determining" may include, for example, regarding receiving (e.g., receiving information), transmitting (e.g., transmitting information), input, output, and accessing (e.g., accessing data in a memory) as "judging" and "determining". In addition, "judging" and "determining" may include regarding resolving, selecting, choosing, establishing, comparing and the like as "judging" and "determining". That is, "judging" and "determining" may include regarding some operations as "judging" and "determining". Furthermore, "judgement (determination)" may be read as "assuming", "expecting", "considering", and the like.

In the present disclosure, the term "A and B are different" may mean "A and B are different from each other". It should be noted that the term may mean "A and B are each different from C". Terms such as "separated", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST 10 wireless communication system
50 CU 100A, 100B, 100C wireless communication node
110 wireless transmitting unit
120 wireless receiving unit
130 NW IF unit
140 power control information receiving unit
150 control unit
161 wireless transmitting unit
162 wireless receiving unit
170 control unit
180 power control information transmitting unit
UE 200
210 wireless transmitting unit
220 wireless receiving unit
230 power control information receiving unit
240 control unit
1001 processor
1002 memory
1003 storage
1004 communication device
1005 input device
1006 output device
1007 bus

The invention claimed is:

1. A radio communication node comprising:
a Mobile Termination, which is a function for connecting to an IAB (Integrated Access and Backhaul) donor node;
a Distributed Unit, which is a function for connecting to an IAB child node;
a processor that configures a target value of a downlink transmission power from the IAB donor node; and
a transmitter that indicates, to the IAB donor node, power control information related to the target value using a specific index of LCID (Logical Channel ID) in a MAC-CE (Medium Access Control-Control Element).

2. A radio communication method performed by a radio communication node including a Mobile Termination, which is a function for connecting to an IAB (Integrated Access and Backhaul) donor node, and a Distributed Unit, which is a function for connecting to an IAB child node, comprising:
configuring a target value of a downlink transmission power from the IAB donor node; and
indicating, to the IAB donor node, power control information related to the target value using a specific index of LCID (Logical Channel ID) in a MAC-CE (Medium Access Control-Control Element).

* * * * *